United States Patent [19]

Klose

[11] 4,076,135

[45] Feb. 28, 1978

[54] APPARATUS FOR PROCESSING CASSETTES CONTAINING EXPOSED PHOTOGRAPHIC FILMS

[75] Inventor: Klaus Klose, Holzkirchen, Germany

[73] Assignee: AGFA-Gevaert, Aktiengesellschaft, Leverkusen, Germany

[21] Appl. No.: 729,773

[22] Filed: Oct. 5, 1976

[30] Foreign Application Priority Data

Oct. 9, 1975 Germany ............................ 2545215

[51] Int. Cl.[2] ............................................. B65G 65/04

[52] U.S. Cl. ................................ 214/300; 193/35 G; 214/304; 354/310; 354/312; 354/313

[58] Field of Search ....................... 214/300, 304, 305; 354/307, 308, 309, 310, 311, 312, 313; 193/35 G, 43 D

[56] References Cited

U.S. PATENT DOCUMENTS

| | | | |
|---|---|---|---|
| 3,827,588 | 3/1973 | Gnage et al. | 214/305 |
| 3,866,744 | 2/1975 | Klose | 193/43 D |
| 3,934,735 | 1/1976 | Schmidt | 214/310 |

*Primary Examiner*—Lawrence J. Oresky
*Attorney, Agent, or Firm*—Peter K. Kontler

[57] ABSTRACT

An apparatus for processing cassettes which contain exposed photographic roll films has an inclined chute the upper part of which receives successive loaded cassettes in predetermined orientation by way of a duct when a first turnable gate between the duct and the chute is held in open position. The first gate can seal an inlet opening at the upper end of an antechamber which is adjacent to the upper part of the chute and is dimensioned to receive one casette at a time. The outlet opening at the lower end of the antechamber can be sealed by a second turnable gate which, when moved to the open position (simultaneously with movement of the first gate to closed position or vice versa), allows a loaded cassette to descend onto a third turnable gate and to assume an optimum position for removal of exposed photographic film therefrom. When the third gate is moved to open position, it allows an empty cassette to pass through a conduit and into a collecting receptacle. The gates are mounted on a shaft which is rotatable back and forth by an electromagnet. At least the first and second gates are sector-shaped and overlap each other to such an extent that the first gate prevents penetration of light into the antechamber by way of the inlet opening when the second gate exposes at least a portion of the outlet opening of the antechamber, and vice versa. The films which are removed from cassettes resting on the third gate are spliced together to form an elongated web which is transported through a developing machine.

27 Claims, 3 Drawing Figures

1
2a
3
II
2
4a'
7
II
111
104a
11
4A
5
4a
4a''
4
4b
8c
8
6a
8b
6b
7
8a
17
112
12
18
108
7

104c'
14
4c
13
113
6c
104c
9
10
204

APPARATUS FOR PROCESSING CASSETTES CONTAINING EXPOSED PHOTOGRAPHIC FILMS

BACKGROUND OF THE INVENTION

The present invention relates to apparatus for manipulating containers for photographic films, and more particularly to improvements in apparatus for processing cassettes or analogous containers for exposed photographic roll films. Still more particularly, the invention relates to apparatus for assembling exposed photographic roll films into a continuous web which is ready to be transported through a developing machine.

The automation of development and copying techniques in photographic processing laboratories renders it necessary to splice together a large number of customer films so that the resulting web can be transported through successive developing, fixing, rinsing, drying, printing, severing and other stations. As a rule, a web will consist of a very large number of spliced-together customer films so that its overall length is in the range of several hundred meters. Apparatus which are used for uniting customer films into a continuous web are known as presplicers. An important requirement for convenient servicing of a presplicer is that the attendant or attendants can insert successive cassettes with exposed customer films therein in daylight or artificial light, i.e., that the attendant or attendants need not work in a darkroom. Furthermore, the apparatus must be designed with a view to insure that exposed films are removed from their containers in the absence of any stray light.

In accordance with a presently known proposal, the inlet of the apparatus is provided with a flap which seals the inlet during removal of exposed film from the previously inserted cassette. Upon removal from the cassette, the exposed film must be transported to a further station, e.g., to a splicing station, along a path which is completely shielded from light which reaches the film removing station during introduction of a fresh cassette. The mechanism for transporting successively removed films from the removing station to the next-following station utilizes grippers which contribute to the bulk, complexity and cost of the apparatus. Moreover, the movements of the flap at the inlet of the apparatus must be controlled by a rather complex system which must insure that the flap automatically prevents entry of any light during removal of exposed film from a previously introduced cassette or which must produce a readily detectable signal to warn the attendants that the flap should remain closed because the apparatus is in the process of removing exposed film from the respective cassette.

OBJECTS AND SUMMARY OF THE INVENTION

An object of the invention is to provide an apparatus wherein exposed photographic films are effectively shielded from light during and subsequent to removal from their containers in a simple, inexpensive and space-saving manner.

Another object of the invention is to provide an apparatus whose energy requirements for transport of containers toward and from the film removing locus are practically nil and which insures that each and every container invariably reaches the aforementioned locus in an optimum orientation for rapid removal of exposed film therefrom.

A further object of the invention is to provide novel and improved means for conveying containers for exposed photographic roll films into and from the range of the film removing mechanism.

An additional object of the invention is to provide an apparatus which automatically removes exposed photographic films from successive customer cassettes, which automatically collects empty cassettes, and whose output is sufficiently high to warrant its use in modern film processing laboratories.

Still another object of the invention is to provide the apparatus with novel and improved means for shielding the film removing mechanism from light, at least while the mechanism is in the process of removing an exposed photographic film from the respective container.

The invention is embodied in an apparatus for processing containers for photographic films, particularly cassettes which contain exposed photographic roll films. The apparatus comprises a downwardly inclined chute or an analogous conveyor which defines a predetermined path for transport of successive containers in a predetermined direction (e.g., downwardly at an angle of 30°–40° with respect to a vertical plane), an enclosure which is adjacent to a first portion of the path and defines an antechamber having an inlet opening for admission of containers into the antechamber and an outlet opening for evacuation of containers from the antechamber (the antechamber can be defined in part by the conveyor and may constitute an elongated tube with the inlet opening at the upper end and the outlet opening at the lower end thereof so that the containers can enter and leave the antechamber by gravity), means for removing films from successive containers in a second portion of the path downstream of the outlet opening (as considered in the aforementioned direction), and a light-intercepting gate (e.g., a rotary sector-shaped plate or vane) which is movable between at least one operative position in which the gate prevents the penetration of light and the transport of containers from the antechamber into the second portion of the path (the second portion of the path is preferably located in a dark chamber) by way of the outlet opening, and a second or inoperative position in which the first and second portions of the path are in communication with each other by way of the outlet opening and the conveyor is free to transport or permit the movement of a container from the antechamber into the range of the film removing means.

The apparatus preferably further comprises a second gate which is movable between at least one operative position in which the second gate prevents the penetration of light and the transport of containers into the antechamber by way of the inlet opening, and a second or inoperative position in which the inlet opening is exposed for entry of containers into the antechamber. Still further, the apparatus preferably comprises means for moving the gates between the respective operative and second positions and a duct for admission of containers into the antechamber by way of the inlet opening in the second position of the second gate. The duct is preferably provided with means for confining successive containers to movement therethrough in a predetermined orientation.

The moving means is preferably constructed and assembled in such a way that one of the gates is maintained in the respective second position when the other gate assumes an operative position and vice versa. This insures that the inlet opening of the antechamber admits light and a container into the antechamber only when the outlet opening is sealed by the first mentioned gate, and that the outlet opening is at least partly exposed only when the second gate assumes an operative position.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
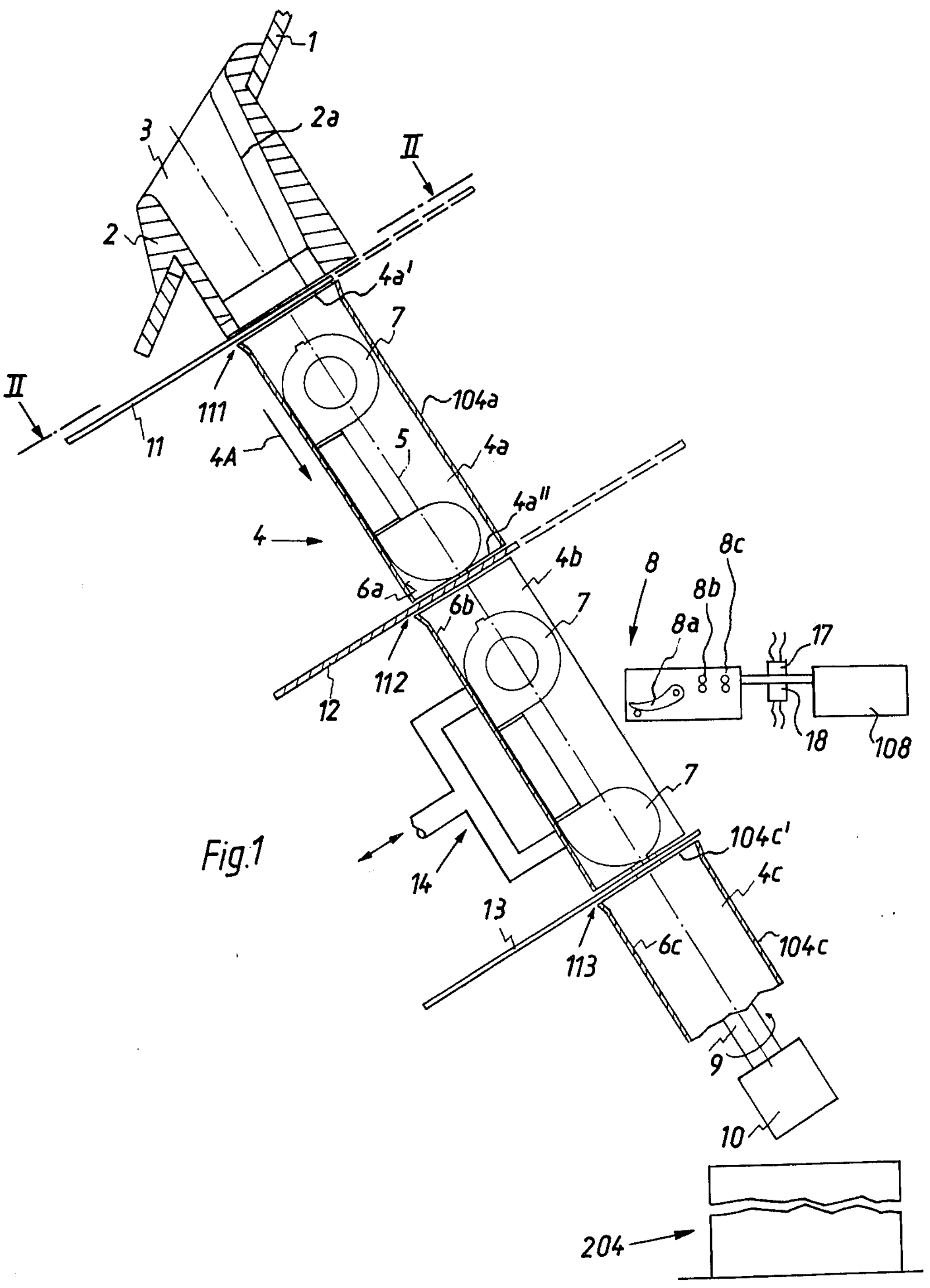
FIG. 1 is a schematic longitudinal vertical sectional view of an apparatus which embodies the invention.

Referring to FIG. 1, there is shown an apparatus for processing containers 7 which contain exposed photographic roll films. Such containers are mailed or delivered by customers to a dealer or directly to a processing laboratory wherein exposed films are removed from the respective containers, spliced together to form an elongated web, developed and returned to customers or dealers. In most instances, the processing laboratory makes prints of some or all frames of each exposed and developed film; the prints are assembled with the respective films, placed into envelopes and shipped to or picked up by the dealers or customers.

The apparatus comprises a frame or housing including a suitably inclined plate-like front wall 1 having an opening for a duct 2, preferably of the type disclosed in my commonly owned U.S. Pat. No. 3,866,744 granted Feb. 18, 1975. The duct 2 includes means 2*a* (e.g., suitable shoulders, ribs, lobes, recesses, grooves, etc.) which confines a loaded customer container 7 to a single predetermined orientation if the container is to advance through and beyond the passage which is defined by the duct. The inlet of the duct 2 is shown at 3. An attendant standing or sitting next to the inlet 3 feeds into the duct 2 successive containers 7, and each such container is free to advance through and beyond the duct 2 provided that it has been inserted in proper orientation such as is necessary and desirable for convenient removal of exposed photographic roll film from its interior. The illustrated containers 7 are of the type known as "110 cassettes" which are used in many presently popular still cameras.

The lower end of the duct 2 is located immediately above a suitable conveyor 4 here shown as an elongated plate-like chute making an angle of 30°-40° (most preferably about 35°) with a vertical plane. This insures that a container 7 which emerges from the lower end of the duct 2 exhibits a strong tendency to slide by gravity along the right-hand surface of the chute 4. The direction of movement of successive containers 7 from the duct 2 and along the right-hand side of the chute or conveyor 4 is indicated by an arrow 4A. The elongated path along which the containers 7 advance during movement relative to the chute 4 is indicated by a phantom line 5.

Figure 2:
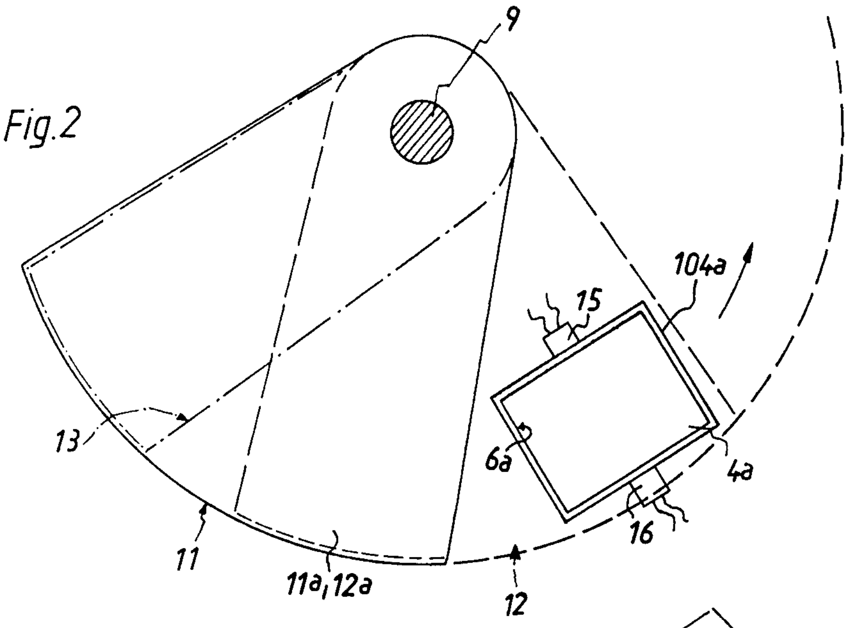
FIG. 2 is a transverse sectional view as seen in the direction of arrows from the line II—II of FIG. 1, showing the first mentioned gate in an operative position and the second gate in the inoperative position.
Figure 3:
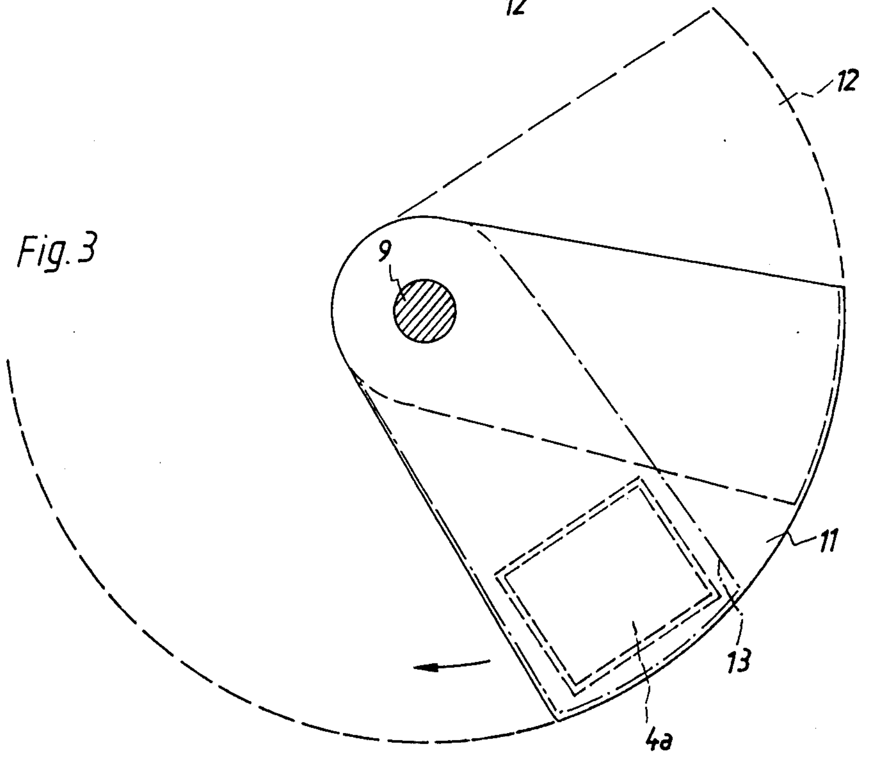
FIG. 3 illustrates the structure of FIG. 2, with the first mentioned gate in the inoperative position and the second gate in an operative position.

That (first) portion of the path 5 for containers 7 which is located immediately below the duct 2 is surrounded by an enclosure 104*a* which defines with the respective portion of the chute 4 an elongated compartment or antechamber 4*a* having an inlet opening 4*a*' at its upper end and an outlet opening 4*a*" at its lower end. FIGS. 2 and 3 show that the antechamber 4*a* has a rectangular cross-sectional outline and that the cross-section of the antechamber is large enough to allow for sliding movement of successive containers 7 into the antechamber by way of the inlet opening 4*a*' and from the antechamber by way of the outlet opening 4*a*". The length of the antechamber 4*a*, as considered in the direction indicated by arrow 4A, is preferably such that this chamber receives one loaded customer container 7 at a time. That guide surface of the chute 4 along which a container 7 slides during entry into the antechamber 4*a* is shown at 6*a*. This surface is flush with a guide surface 6*b* which is adjacent to a second portion of the path 5 for containers 7. When a container 7 reaches such second portion of the path, it is in an optimum position for removal of exposed photographic roll film from its interior. Certain parts of the film removing mechanism are shown at 8; this mechanism may be similar to or identical with that which is disclosed in the commonly owned U.S. Pat. No. 3,921,878 granted Nov. 25, 1975 to Zangenfeind or in the commonly owned copending application Ser. No. 652,107 filed Jan. 6, 1976 by Zangenfeind et al., now U.S. Pat. No. 4,004,724 granted Jan. 25, 1977. FIG. 1 merely shows a deflector 8*a* which enters into the space between the customary backing strip and the exposed roll film to insure that the leader of the film advances into the nip of first advancing rolls 8*b*, thereupon into the nip of second advancing rolls 8*c* and finally toward and into a splicing mechanism 108 wherein the leader is attached to the trailing end of the preceding exposed roll film. The mechanism 108 converts successive roll films into a continuous web which is ready for transport through a developing machine, not shown.

The just discussed second portion of the path 5 for containers 7 must be completely shielded from light during removal of exposed photographic film from a container 7 which abuts against the guide surface 6*b*. FIG. 1 merely shows one of two side walls or panels 4*b* which flank the space in front of the surface 6*b*. Such space is open opposite the surface 6*b* so as to allow for movement of the film toward the nip of the advancing rolls 8*b* and to allow the leader of the backing strip to move below the deflector 8*a* and toward a collecting receptacle in a manner as disclosed in the aforementioned patent to Zangenfeind.

A third portion of the path 5 for containers 7 is located below the film removing mechanism 8 and is surrounded by a conduit 104*c* defining with the chute 4 an elongated passage 4*c* serving for evacuation of empty containers 7. Such empty containers enter the conduit 104*c* by way of the inlet 104*c*' and slide along a guide surface 6*c* forming part of the chute 4 and being flush with the guide surfaces 6*a*, 6*b*. A receptacle 204 is located below the discharge end of the conduit 104*c* to collect empty containers.

In accordance with a feature of the invention, the apparatus further comprises three gates 11, 12 and 13. These gates are secured to an elongated shaft 9 which is parallel to the direction indicated by the arrow 4A and is turnable back and forth between two spaced-apart end positions by a prime mover 10 here shown as a rotary electromagnet. The gates 11 to 13 resemble flat vanes or blades whose planes are normal to the axis of the shaft 9, and at least the two upper gates 11, 12 resemble sectors of a circle (see FIG. 2). The sector-shaped gates 11, 12 extend along arcs of approximately 60° and are angularly offset with respect to each other. The extent of overlap can be seen in FIGS. 2 and 3; it will be noted that the areas of overlapping portions 11*a*, 12*a* of the gates 11, 12 are large enough to enable each of these portions to seal the respective opening 4*a*', 4*a*'' of the antechamber 4*a*.

The gate 11 can be moved into and from a narrow clearance or gap 111 between the lower end of the duct 2 and the inlet opening 4*a*' of the antechamber 4*a*. The gate 12 is movable into and from a narrow gap 112 between the outlet opening 4*a*'' of the antechamber 4*a* and the side walls 4*b*, and the gate 13 is movable into and from a narrow gap 113 between the lower ends of the side walls 4*b* and the inlet 104*c*' of the conduit 104*c*. The gaps 111–113 may be lined with plush to prevent entry of light into the path 5 irrespective of the angular position of corresponding gates 11–13. The bearings for the shaft 9 are not shown in the drawing; this shaft extends in parallelism with the chute 4 all the way from the lower end of the duct 2 (where it supports the uppermost gate 11) and beyond the lower end of the conduit 104*c*. The electromagnet 10 is assumed to turn the shaft 9 through 90° in clockwise and anticlockwise directions whereby the gates 11–13 move between the positions shown in FIGS. 2 and 3. Each gate has at least one operative position in which it extends across the path 5 for the containers 7 and a second or inoperative position in which the respective part of the path 5 is free and a container 7 can slide by gravity from the duct 2 into the antechamber 4*a*, from the antechamber 4*a* into the range of the film removing mechanism 8, or from the range of the mechanism 8 into and through the conduit 104*c*. The angular displacement of the gates 11 and 12 with respect to each other is 30 degrees. When the gate 12 assumes the operative position shown in FIGS. 1 and 2, the gates 11 and 13 are held in their second or inoperative positions. When the gates 11 and 13 assume the operative positions shown in FIG. 3, the gate 12 is held in the second or inoperative position.

In accordance with a slight modification, the apparatus may employ a transfer member 14 which is reciprocable in directions indicated by a double-headed arrow and serves to move a container 7 from the space between the side walls 4*b* to a position nearer to the film removing mechanism 8 and vice versa. The transfer member 14 has prongs adapted to extend through complementary openings (not shown) provided in that portion of the chute 4 which includes the guide surface 6*b*. The prongs may be designed to seal the just mentioned openings in each position of the member 14 and to attract the container which is located below the gate 12 so that the container can be moved into the range of the removing mechanism 8 and back onto the gate 13 (subsequent to removal of the respective exposed film). The prongs thereupon release the empty container which can descend into the receptable 204*c* as soon as the gate 13 reassumes its inoperative position. Reference may be had to the commonly owned copending application Ser. No. 729,700 filed Oct. 5, 1976 by Friedrich Hujer et al. for "Apparatus for processing exposed photographic films and cassettes for such films."

The openings for the prongs of the transfer member 14 need not be sealed if the housing including the front wall 1 is designed to completely confine all parts of the apparatus, i.e., if light can enter only by way of the duct 2 when the gate 11 is held in the inoperative position. The transfer member 14 is then installed in such housing.

The operation:

When an attendant inserts a loaded container 7 into the inlet 3 of the duct 2, the gates 11–13 are held in the positions shown in FIGS. 1 and 2, i.e., the gate 12 seals the outlet opening 4*a*'' of the antechamber 4*a* so that it prevents penetration of light from the antechamber 4*a* into the second portion of the path 5 (the locus of the film removing mechanism 8), the gate 11 is in the inoperative position so that a properly oriented container 7 can slide along the guide surface 6*a* and comes to rest on the gate 12, and the gate 13 is also in the inoperative position so that an empty container (from which the film has been removed by the mechanism 8) can slide along the surface 6*c* and into the collecting receptacle 204.

When a loaded container 7 comes to rest on the gate 12, a detector (e.g., a photoelectric cell including a light source 15 and a photosensitive transducer 16 shown in FIG. 2) completes the circuit of the electromagnet 10 so as to turn the shaft 9 anticlockwise from the end position of FIG. 2 to the end position of FIG. 3. The photoelectric cell 15, 16 can be replaced by a pressure-sensitive switch in the gate 12 or by any other suitable means which can detect the presence of a loaded container 7 in the antechamber 4*a*. While the shaft 9 rotates anticlockwise, as viewed in FIG. 2, the gate 11 moves toward its first operative position and the gate 12 moves from that operative position which is shown in FIG. 2. Due to the aforedescribed overlap of the gates 11 and 12, the gate 12 begins to expose the outlet opening 4*a*'' of the antechamber 4*a* only after the gate 11 has already assumed the first of several operative positions in each of which the passage of the duct 2 is sealed from the inlet opening 4*a*' of the antechamber 4*a*. This insures that the antechamber 4*a* is sealed against penetration of light via duct 2 before the gate 12 establishes at least some communication between the first and second portions of the path 5 for the containers 7 via outlet opening 4*a*''. The lowermost gate 13 assumes its operative position when the shaft 9 has completed an (anticlockwise) angular movement through 90°, i.e., when the inlet opening 4*a*' is completely sealed and the outlet opening 4*a*'' is sufficiently open to allow a container 7 which was introduced into the antechamber 4*a* to enter by gravity the second portion of the path 5 and to be in an optimum position for removal of exposed film from its interior by means of the mechanism 8. Such container 7 rests on the gate 13. The manner in which the film is removed from the container 7 which rests on the gate 13 is the same as or analogous to that disclosed in the aforementioned patent to Zangenfeind.

When the exposed film is completely withdrawn from the container 7 resting on the gate 13, a second detector transmits a signal which causes the electromagnet 10 to rotate the shaft 9 clockwise from the end position of FIG. 3 and back to the end position of FIG. 2. The second detector may include a photoelectric cell 17, 18 which monitors the path of exposed roll film between the advancing rolls 8c and the splicing mechanism 108 or the position of the pusher which is disclosed in the aforementioned patent to Zangenfeind. During the first stage of clockwise rotation of the shaft 9, the gate 13 moves from the operative position of FIG. 3 and allows the empty container 7 to leave the second portion of the path 5 by gravity and to descend into the receptacle 204 by moving through the conduit 104c. At the same time, the median gate 12 moves toward its first operative position in which the outlet opening 4a'' is sealed to prevent penetration of light from the interior of the antechamber 4a into the space where a loaded container 7 dwells during removal of exposed film from its interior. The gate 11 moves toward its second or inoperative position and begins to admit light from the duct 2 into the antechamber 4a (via inlet opening 4a') not earlier than when the gate 12 already seals the outlet opening 4a''. The next loaded container 7 can pass through the duct 2 and enter the antechamber 4a as soon as the gates 11–13 reassume the positions shown in FIG. 2.

The period of time during which the gates 11–13 dwell in the positions shown in FIG. 3 is determined by the film removing mechanism 8, i.e., by the interval which is needed to withdraw or remove an exposed film from the container 7 resting on the gate 13. As a rule, the length of such interval is in the range of a few seconds. The time which elapses while the mechanism 8 removes exposed film from a container 7 resting on the gate 13 is not wasted because the attendant invariably requires a certain amount of time to properly orient the next loaded container 7 so that such container will be allowed to enter the duct 2 via inlet 3 and to advance through the duct and into the antechamber 4a as soon as the gate 11 reassumes its inoperative or second position. In other words, temporary sealing of the inlet opening 4a' does not reduce the output of the apparatus.

The improved apparatus is susceptible of many further modifications. For example, the configuration of the gate 11, 12 and/or 13 may be varied and the apparatus may operate only with the gates 11, 12 (or only with the gate 12) if the station below the gate 12 accommodates means for expelling empty containers 7 in a different way, e.g., toward or away from the observer of FIG. 1. Furthermore, the means for moving the gates 11–13 between their operative and inoperative positions may comprise a discrete moving device for each gate or a discrete moving device for one of the gates and a second moving device for the other two gates. All that counts is to insure that the gate 12 or an equivalent gate seals the outlet opening 4a'' before the inlet opening 4a' of the antechamber 4a admits light into the first portion of the path 5, and that the gate 11 or an equivalent gate seals the inlet opening 4a' while the outlet opening 4a'' is at least partly exposed. If the gates are turnable or otherwise displaceable by discrete moving means, the apparatus may comprise a suitable control unit which insures that the gates are moved in a predetermined sequence and that each of these gates dwells in the operative or inoperative position for a preselected interval of time.

An important advantage of the apparatus is that the antechamber 4a can receive a loaded container 7 while the mechanism 8 removes exposed film from the preceding container, that the station where the film is removed is always sealed against entry of light via antechamber, and that the conveyor (chute 4) need not be driven by a prime mover because the inclination of its guide surfaces 6a–6c can be readily selected in such a way that the containers slide therealong by gravity. The gates 12 and 13 perform the dual function of preventing penetration of light into the space where the film is removed from the respective container 7 as well as of serving as supports for containers which are located in the antechamber (gate 12) and in the range of the removing mechanism 8 (gate 13). The manner in which the transfer member 14 is manipulated to move a container from the gate 13 into the range of the film removing mechanism 8 and back onto the gate 13 before the latter moves to its inoperative position is disclosed in the copending application Ser. No. 729,700, of Hujer et al.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. In an apparatus for processing containers for photographic films, particularly cassettes for exposed photographic roll films, a combination comprising a conveyor defining a predetermined path for transport of successive containers in a predetermined direction; an enclosure adjacent to a first portion of said path and defining an antechamber having an inlet opening for admission of containers into and an outlet opening for evacuation of containers from said antechamber; means for removing films from successive containers in a second portion of said path which is located downstream of said outlet opening, as considered in said direction; a light-intercepting gate movable between at least one operative position in which said gate prevents the penetration of light and the transport of containers from said antechamber into said second portion of said path by way of said outlet opening and a second position in which said portions of said path are in communication with each other by way of said outlet opening and said conveyor is free to transport a container from said antechamber into the range of said removing means; and light intercepting means for sealing said inlet opening thus preventing penetration of light into the antechamber in said second position of said gate.

2. In an apparatus for processing containers for photographic films, particularly cassettes for exposed photographic roll films, a combination comprising a conveyor defining a predetermined path for transport of successive containers in a predetermined direction; an enclosure adjacent to a first portion of said path and defining an antechamber having an inlet opening for admission of containers into and an outlet opening for evacuation of containers from said antechamber; means for removing films from successive containers in a second portion of said path which is located downstream of said outlet opening, as considered in said direction; a light-intercepting gate movable between at least one operative position in which said gate prevents the penetration of light and the transport of containers from said antechamber into said second portion of said path by way of said outlet opening and a second position in which said portions of said path are in communication with each other by way of said outlet opening and said conveyor is free to transport a container from said antechamber into the range of said removing means; a second gate movable between at least one operative position in which said second gate prevents the penetration of light and the transport of containers into said antechamber by way of said inlet opening and a second position in which said inlet opening is exposed for entry of containers into said antechamber; and means for moving said gates between the respective operative and second positions.

3. A combination as defined in claim 2, further comprising a duct for admission of containers into said antechamber by way of said inlet opening in the second position of said second gate.

4. A combination as defined in claim 3, wherein said duct comprises means for confining successive containers to movement therethrough in a single predetermined orientation.

5. A combination as defined in claim 2, wherein said moving means includes means for maintaining one of said gates in said second position when the other of said gates assumes an operative position and vice versa so that inlet opening admits light and containers into said antechamber only when said outlet opening is sealed and said outlet opening is at least partially exposed only when said second gate assumes an operative position.

6. A combination as defined in claim 5, wherein said gates are sector-shaped and are turnable between the respective operative and second positions about a common axis.

7. A combination as defined in claim 6, wherein said axis is parallel to said direction.

8. A combination as defined in claim 6, wherein said moving means comprises a rotary shaft and said gates are disposed in planes which are at least substantially normal to the axis of said shaft, said moving means further comprising means for rotating said shaft.

9. A combination as defined in claim 8, wherein said rotating means comprises an electromagnet.

10. A combination as defined in claim 8, wherein said gates are angularly offset with respect to each other.

11. A combination as defined in claim 10, wherein said rotating means comprises a device for turning said shaft back and forth between first and second end positions in which said first mentioned gate and said second gate respectively assume their second positions, the extent to which said gates are angularly offset with respect to each other being such that said first mentioned gate seals said portions of said path from each other during movement of said shaft from said second end position until said second gate begins to seal said inlet opening and that said second gate seals said inlet opening during movement of said shaft from said first end position until said first mentioned gate begins to seal said portions of said path from each other.

12. A combination as defined in claim 11, wherein predetermined portions of said gates overlap each other.

13. A combination as defined in claim 12, wherein the predetermined portion of at least one of said gates is large enough to seal the respective opening of said antechamber.

14. A combination as defined in claim 2, wherein said conveyor is a downwardly inclined chute.

15. A combination as defined in claim 14, wherein the inclination of said chute with respect to a vertical plane is between 30° and 40°.

16. A combination as defined in claim 14, wherein the inclination of said chute with respect to a vertical plane is approximately 35°.

17. A combination as defined in claim 2, further comprising a conduit adjacent to a third portion of said path downstream of said second portion, as considered in said direction, and having an inlet facing said second portion of said path, and a third gate movable between at least one operative position in which said third gate seals said second portion of said path from said inlet and supports a container in the range of said removing means and a second position in which an empty container can advance from said second portion of said path into said conduit.

18. A combination as defined in claim 17, wherein said moving means includes a shaft which is parallel to said direction and said gates are rigid with and disposed in planes substantially normal to the axis of said shaft.

19. A combination as defined in claim 17, further comprising means for moving said third gate to the second position in response to movement of said first mentioned gate to an operative position and vice versa.

20. A combination as defined in claim 17, wherein said conduit has an outlet for the discharge of empty containers by gravity.

21. A combination as defined in claim 20, further comprising means for collecting discharged empty containers.

22. A combination as defined in claim 17, further comprising means for moving said third gate between the respective operative and second positions simultaneously with said second gate.

23. A combination as defined in claim 22, wherein said second and third gates assume the respective operative positions in the second position of said first mentioned gate, and vice versa.

24. A combination as defined in claim 2, further comprising means for actuating said moving means so as to move said first mentioned gate to an operative position and said second gate to the second position in response to entry of a container into said antechamber.

25. A combination as defined in claim 24, wherein said actuating means comprises means for monitoring said antechamber for the presence and absence of containers therein.

26. A combination as defined in claim 2, further comprising means for actuating said moving means so as to move said first mentioned gate to the second position simultaneously with movement of said second gate to an operative position in response to completion of withdrawal of film from a container in said second portion of said path.

27. A combination as defined in claim 26, wherein said actuating means comprises a detector located in the region of said removing means.

* * * * *